United States Patent [19]

Kasahara

[11] 4,176,363

[45] Nov. 27, 1979

[54] INK JET PRINTING APPARATUS

[75] Inventor: Tadashi Kasahara, Tokyo, Japan

[73] Assignee: Konishiroku Photo Industry Co., Ltd., Tokyo, Japan

[21] Appl. No.: 915,550

[22] Filed: Jun. 14, 1978

[30] Foreign Application Priority Data

Jun. 25, 1977 [JP] Japan .................................. 52-74948

[51] Int. Cl.[2] .............................................. G01D 15/18

[52] U.S. Cl. .................................... 346/140 R; 346/75

[58] Field of Search .............................. 346/140 R, 75

[56] References Cited

U.S. PATENT DOCUMENTS 3,925,788 12/1975 Kashio .................................. 346/75

3,925,789 12/1975 Kashio .................................. 346/75

4,123,761 10/1978 Kimura ........................... 346/140 R

*Primary Examiner*—Joseph W. Hartary

*Attorney, Agent, or Firm*—Limbach, Limbach & Sutton

[57] ABSTRACT

An ink jet printing apparatus is disclosed which includes a printing head having a plurality of ink ejection nozzles and adapted to be moved relatively to a recording medium for effecting printing or characters of figures in accordance with print instruction signals, the printing head being periodically displaced, in accordance with a timing signal from a timer, to a fixed position at which an ink failure preventive ejection is performed from the nozzles in response to a detecting signal delivered from a detector upon detecting the positioning of the head at the fixed position.

7 Claims, 3 Drawing Figures

INK JET PRINTING APPARATUS

BACKGROUND OF THE INVENTION

This invention relates to an ink jet printing apparatus wherein a printing head having a plurality of nozzles is moved relatively to a recording medium, and ink droplets are jetted selectively from the individual nozzles by the sudden reduction of the inner volume of an ink chamber communicating with the nozzles to print characters or figures.

An ink jet printing apparatus of such type is disclosed, for example, in U.S. Pat. No. 3,946,398. In such a recording system, since ink droplets are jetted selectively from the nozzles depending on a printing pattern, some of the nozzles are often left in a state waiting for ejection for a long time so that ink-failure is liable to occur not only at initiation of the printing but also during the printing operation due to the clogging of the nozzle tip.

In the meantime, there have been heretofore known several single-nozzle type ink jet printing apparatuses which may avoid a possible ink-failure problem, including the one disclosed in U.S. Pat. No. 3,925,789 in which the recording action is performed posterior to an ink-failure preventive ejection if a printing instruction is received after non-printing period exceeds a preset time of a timer; the one disclosed in Japanese Published Unexamined Patent Application No. 57518/1975 and U.S. Pat. No. 3,925,788 in which an ink-failure preventive ejection is performed at the interval of a timer preset time during the non-printing period; and the one disclosed in Japanese Published Unexamined Patent Application No. 93633/1976 in which an ink-failure preventive ejection is effected for a predetermined short period of time if the non-printing state is present during the predetermined short period at the interval of a timer preset time. Thus, the ink-failure preventive ejection in any of the known single-nozzle type ink jet printing apparatuses is carried out for the first time after occurrence of a non-printing state where print information is not fed to a print controller while a printing device is supplied with an electric power. Therefore, if the above technic is applied to a multiple-nozzle type ink jet printing apparatus, apart from ink-failure preventive ejection required at the initiation of printing, it becomes necessary to check the jetting state of each nozzle for the prevention of an ink-failure that would occur in the nozzles which are not in continuous jetting action and are in the waiting state during the printing mode, so that complication of the apparatus structure is unavoidable. In addition, it is extremely difficult to enable the nozzles, which are arrayed in parallel in the printing head, to perform selective ink-failure preventive ejection.

SUMMARY OF THE INVENTION

This invention is directed to an improved ink jet printing apparatus having a plurality of parallel nozzles provided at a printing head, wherein an ink-failure preventive ejection is effected, with a predetermined time interval, from the nozzles at a fixed position.

The ink-failure preventive ejection position is located at a point deviated from a printing region of the head on a recording medium. A timer for generating a timing signal and a detector for detecting the setting of the printing head at the ink-failure preventive ejection position are provided, wherein a print controller for controlling both the relative motion of the printing head to the recording medium and the ink jet from the nozzles in response to a print signal from a source of print command signals is further enabled to control the displacement of the printing head to the ink-failure preventive ejection position in accordance with the timing signal of the timer, also the ink-failure preventive jet from the nozzles in accordance with the output signal of the detector, and subsequently return of the printing head to the former position and resumption of the printing operation.

It is,. accordingly, an object of the present invention to provide an improved ink jet printer with which occurrence of ink-failure may be completely eliminated.

BRIEF DESCRIPTION OF THE DRAWINGS

Other objects, features and advantages of this invention will become apparent from the detailed description of the preferred embodiment which follows, when considered in light of the accompanying drawings, in which.

DETAILED DESCRIPTION OF THE PREFERRED EMBODIMENTS OF THE INVENTION

Figure 1:
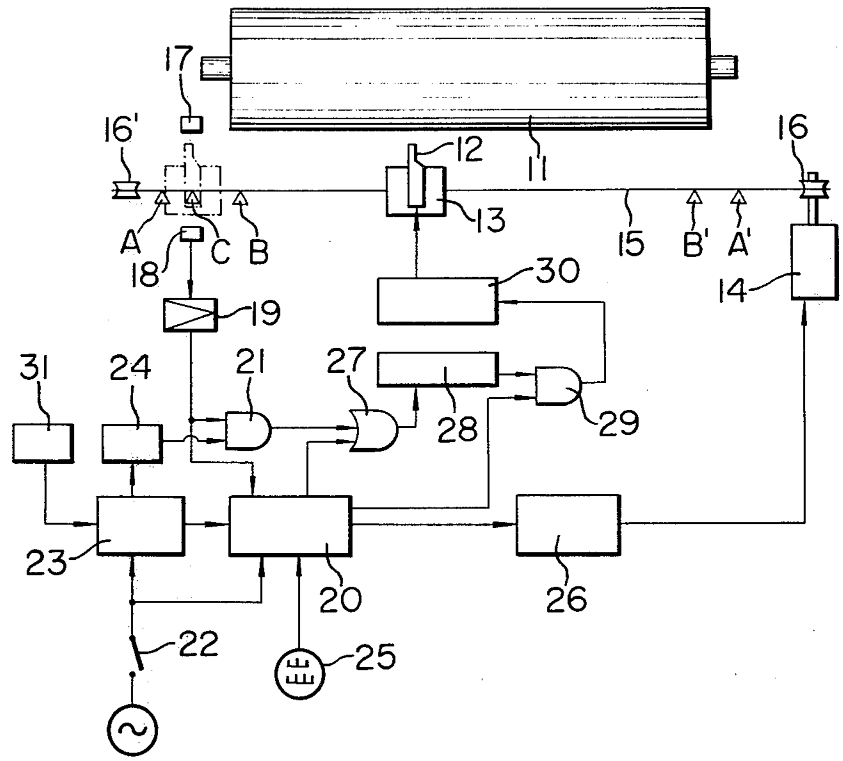
FIG. 1 is a block diagram schematically showing an embodiment of the present invention.
Figure 2:
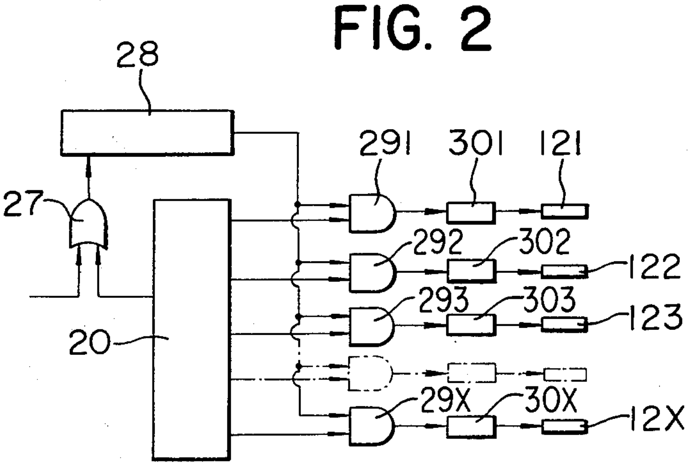
FIG. 2 is a partial block diagram schematically illustrating the relationship between a print controller and a plurality of ink jet nozzles.

Referring to FIGS. 1 and 2, labeled as 11 is a recording medium placed on a platen and recorded by ink jet from a printing head 12 having a plurality of vertical, parallel nozzle heads labeled as 121, 122, . . . 12X in FIG. 2. The printing head 12 is mounted on a carriage 13 which can be moved between A and A', by means of a pulse motor 14 driven by a motor drive unit 26, through a conveyor belt 15. Labeled as 16 is a drive pulley, and 16' is a tension pulley.

When a power source switch 22 is thrown to the ON position and when a print control device 20 receives printing instructions transmitted from a source 25 of print command signals, the device 20 generates an ejection signal and a moving signal in accordance with the print signal so that the printing head is moved between B–B' by means of the motor 14 and ink droplets are jetted selectively and independently from the nozzles, thereby effecting printing on the recording medium 11 within the printing region B–B' included in the maximum moving region A–A'. The position C where the head 12 performs an ink-failure preventive ejection is located within a region A–B or B'–A', and an ink reservoir 17 for collecting the ink jetted from the nozzles is disposed adjacent to the position C, where a position detector 18 is also disposed for detecting that the printing head is positioned there. The position detector 18 may be constituted of a microswitch, photoelectric detector, magnetic detector or the like and may generate an output signal upon detection of the printing head 12. The output signal of the detector 18 is amplified by an amplifier 19 and then is fed as an input to the print controller 20 and one terminal of an AND gate 21. Accordingly, in the embodiment illustrated, the means for detecting the setting of the printing head 12 at the ink-failure preventive ejection position C includes the position detector 18 and the amplifier 19.

The printing apparatus is equipped with a timer 23 which is reset to its initial state upon opening of the power switch 22 and is actuated upon closing of the power switch to generate an interval signal or timing signal for a predetermined short time T2. After subsequent measurement of a predetermined time T1, the time 23 is reset automatically to the initial position again and periodically repeats the generation of the same timing signal.

The timer 23 is coupled to a latch 24 and the print controller 20 so that the timing signal generated from the timer 23 serves to set the latch 24 and is then fed as an input pulsed timing signal to another terminal of the AND gate 21, while the timing signal is also delivered to the print controller 20. Consequently, in the embodiment illustrated, the timer means for generating a timing signal for a time period of T2 includes the timer 23 and the latch 24.

When the print controller receives the timing signal from the timer 23, transmission of the print instruction signals from the source 25 is interrupted for stopping the jetting and moving operation of the printing head, i.e. printing operation. At the same time, the print controller 20 generates a moving signal so that the pulse motor 14 is driven through the motor drive circuit 26 to displace the printing head 12 to the ink-failure preventive ejection position C while memorizing or recording the displaced distance from the stopped position to the position C of the printing head 12 in the print controller 20. The recordation of the present printing-head position is performed by any known means, either in the form of analogue value with the use of a magnetic recording head attached to the carriage 13 or in the form of digital value by counting the number of drive pulses of the pulse motor 14 during the time required for the printing head to reach the position C.

The ink-failure preventive ejection is effected at the position C in accordance with an ejection signal delivered from the control device 20 as follows. That is, when the position detector 18 detects the positioning of printing head 12 at the position C, the output signal of the detecting means is fed to both the AND gate 21 and the print controller 20. Since the pulsed timing signal from the latch 24 of the timer means is also fed as another input to the AND gate 21, the AND gate 21 produces an output, which is then fed to one terminal of an OR gate 27 whose another terminal is coupled to the output from the print controller 20. At this moment, the print controller 20 is interrupting reception of the external print instruction signal from the source 25 as described previously, so that the print instruction signal is not present, and consequently, the OR gate 27 is in the state to receive only the output of the AND gate 21. Therefore, the OR gate 27 produces an output, which is then fed via one-shot circuit 28 to one input terminal of an AND gate 29. And simultaneously the other input terminal of the AND gate 29 receives an ejection signal, for the all nozzles, generated from the print controller 20 in response to the output signal of the detecting means, so that an output is produced from the AND gate 29 and then is fed to a head drive circuit 30, which enables the entire nozzle heads to jet ink droplets therefrom toward an ink reservoir 17. The AND gate 29 and the head drive circuit 30 includes, as shown in FIG. 2, AND gates 291, 292 . . . 29X and head drive circuits 301, 302 . . . 30X corresponding to the nozzle heads 121, 122 . . . 12X, respectively.

T2 represents the time sufficient for the printing head 12 to terminate the aforementioned ink-failure preventive ejection after the print controller 20 receives the timing signal from the timer device. The time T2 is preset in the timer 23 and the latch 24 is released to the initial state by the timer 23 after the lapse of T2.

Consequently, when the time T2 elapses in printing apparatus after the print controller 20 receives the timing signal from the timer 23, the timer intermits generation of the timing signal and measures the time T1 until generation of the next timing signal. In response to the intermission of the timing signal from the timer, the print controller 20 feeds a motor drive signal to the motor drive circuit 26 to drive the pulse motor 14 for returning the printing head 12 to the former stopped position in accordance with the recorded distance. Then the print controller 20 resumes receiving the print signal from the source 25, and generates moving and ejection signals to actuate the pulse motor 14 for positioning the printing head 12 at desired positions in accordance with the print signals and to selectively actuate the AND gate 29 for effecting ink ejection from respective nozzle in accordance with the ejection signals, whereby performing normal printing operation.

Thus, in the apparatus of FIG. 1, every time when the timer 23 measures T1+T2 from its initial state, the timer 23 is released automatically to the initial state, whereby the timer 23 generates a timing signal so that the printing head 12 repeats the aforementioned ink-failure preventive ejection.

It is preferred that the time interval be correctable depending on the ambient conditions by the provision of a temperature/humidity detector 31 which serves to preset the time T1 of timer 23 variably, thereby achieving rational reduction of the ink amount required for ink-failure preventive jet.

Figure 3:
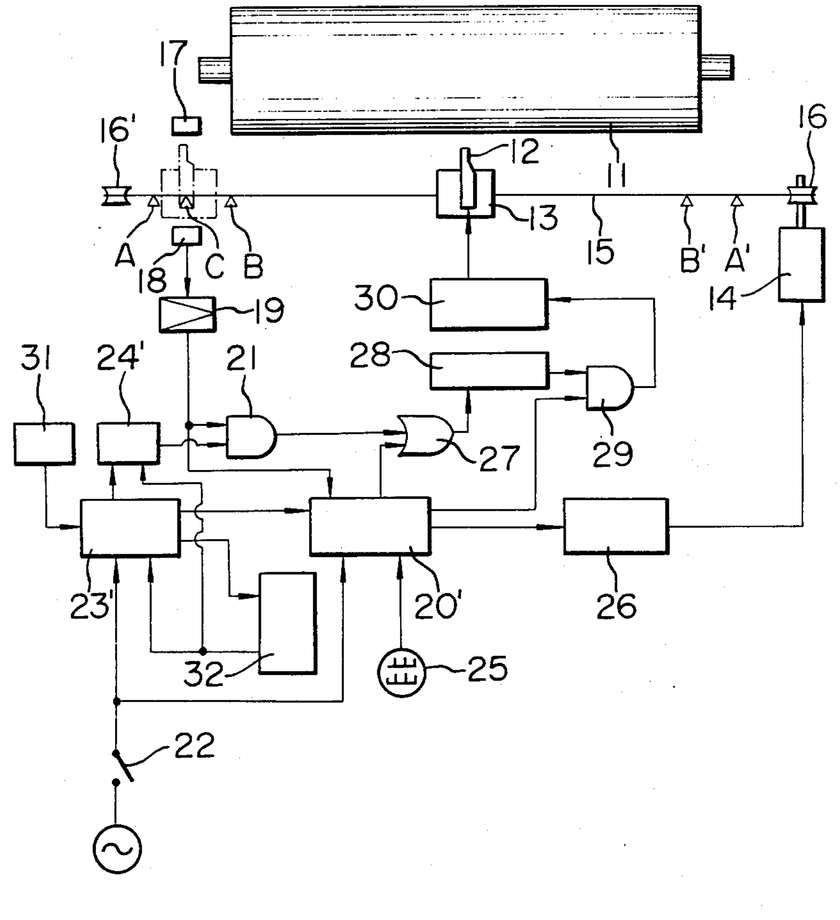
FIG. 3 is a block diagram schematically illustrating another embodiment of the present invention.

Another embodiment of this invention is illustrated in FIG. 3, in which components designated as 11 through 19, 21, 22 and 25 through 31 correspond to and are the same as the like components in FIG. 1, respectively, both in functions and features.

In this embodiment, a timer 23' is provided which is actuated upon closing of a power switch 22 and which is reset to its initial state in response to a reset signal delivered from a delay means 32. The timer 23' generates a timing signal after the lapse of a predetermined time T1 from the initial state.

The time T2 is preset in the delay means 32 such as a timer and a delay circuit, which is actuated upon receipt of the timing signal from the timer 23'. The reset signal delivered from the delay means 32 after the lapse of T2 is fed to the timer 23' and the latch 24' so as to once release them to the initial state.

In the apparatus shown in FIG. 3, when the power switch 22 is thrown to ON position and when a source 25 of print command signals generates printing instructions, a printing head 12 is set at desired positions by means of a pulse motor 14 while ink droplets are jetted selectively from nozzles 121, 122 . . . 12X shown in FIG. 2, as described previously with reference to FIG. 1, thereby effecting printing operation. Simultaneously, the timer 23' commences operation and generates a timing signal upon lapse of T1 at maximum. Then the timing signal is fed to the latch 24' and the delay means 32 for actuation thereof and for generation of an output signal therefrom for the period of T2. The output signal from the timer 23' is also fed to the controller 20' causing interruption of the transmission of print instructions from the source 25, displacement of a print head 13 to an ink-failure preventive ejection position C while remembering the stopped position, and ejection of ink droplets to a reservoir 17 in the same manner as in the apparatus of FIG. 1. When the time T2 elapses, the delay means 32 intermits the generation of the output signal and generates the reset signal, whereupon the timer 23' and the latch 24' are brought back to the initial state while the print head 12 on a carriage 13 is returned to the former stopped position to restart the print operation.

In the printing apparatus of FIG. 1, first the printing head 12 executes ink-failure preventive jet at the position C in response to closing of the power switch 22, and then repeats such jet at the interval of a fixed time T1+T2. While in the printing apparatus of FIG. 3, the printing head 12 executes ink-failure preventive jet at the position C after the lapse of T1 maximally from closing of the power switch 22, and subsequently repeats such jet at the time interval of T1+T2 substantially in the same manner as in the printing apparatus of FIG. 1. Therefore, the apparatus of FIG. 1 is suited for use in the case where any phenomenon that causes failure of ink emission might proceed during opening of the power switch 22, and the apparatus of FIG. 3 is suitably employed in the case where such undesired possibility is not present because the printing head 12 is protected by means of a cap or the like during that period.

When the apparatus of this invention is in a state waiting for printing after power supply, the print head is generally allowed to be positioned at a home position provided at a suitable position between A–B or A'–B'. When the waiting period exceeds the time T1, the head is displaced from the home position to the position C to effect the ink failure preventive ejection in the same manner as described hereinabove.

The multiple-nozzle type ink jet printing apparatus of the present invention is characterized in that occurrence of ink failure is preventable in every nozzle regardless of any printing pattern by the relatively simple structure described hereinabove.

In this invention, the ink-failure preventive jet position C for the printing head 12 may be located at any point between A and B or A' and B', and the home position where the printing head 12 is placed during no-printing mode may be set at the preventive jet position C. Also the structure may be so formed that the head 12 executes the preventive jet while passing through the position C. It is further possible to modify the structure in such a manner that the head 12 passes through the preventive jet position C after each one-line printing, and the preventive jet is executed according to the output signal of an AND gate which is based on the detection signal representing passage of the head through the position C and the timing signal obtained through the latch 24 or 24' of the timer 23 or 23'.

The timer interval T1 for effecting ink-failure preventive jet is to be determined depending on the physical properties of ink and the ambient conditions in the use. Although this time interval is strictly T1+T2, it can be regarded practically as T1 since T2 is extremely short, i.e. generally less than 1 second, in comparison with T1, i.e. generally 1 to 30 minutes. And it is further preferable that T1 is selected to be within the time during which accumulative influence of intermission begins to appear in the ink when intermittent jet is performed continuously from the nozzle, or, more concretely, to be less than ⅓ of the time t during which the front ink droplet (the one jetted first in printing) begins to be influenced by physical or chemical variation of the ink occurring in the nozzle. If T1 is established to be longer than ⅓ t, even though no abnormality occurs in the first jet, the influence of intermission is gradually accumulated and might finally cause an abnormal state after repetition of the jets several or more times. Accordingly, the occurrence of ink failure can be completely prevented by establishing the time interval T1 within the above-described range in which the ink variation caused in the nozzle during the preceding no-printing time is removable by the jet.

The volume V of ink consumed for such preventive jet in the present invention is obtained from the following equation.

$$V=(VoMN/T1)$$

in which: Vo is the volume of one ink droplet; M is the total number of nozzles in the printing head; N is the number of ink droplets jetted from one nozzle in a single ink-failure preventive jet; and T1 is the preset time interval of timer. It has been confirmed from the experimental results that the ink volume V consumed is minimized when the time interval T1 is so established that the ink variation can be completely eliminated within T1 while jetting a single ink droplet from each nozzle (i.e., N=1) and according to the condition that causes no failure of ink in the jet of a single ink droplet, the ink volume consumed for prevention of ink failure is extremely little to render an ink collector unnecessary, so that the ink reservoir 17 requires only a remarkably small capacity of 1/5 cc or less. Therefore, in the case of employing a cap on the nozzle for preventing solidification of ink during opening of the power switch 22, it is permitted to use the cap as an ink reservoir 17 and to actuate a refreshing means suitably for the cap to remove the ink collected therein.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. In an ink jet printing apparatus wherein a printing head having a plurality of parallel nozzles is moved relatively to a recording medium, and ink droplets are projected selectively from the individual nozzles for printing: the improvement characterized in that the printing head is able to be shifted to an ink-failure preventive ejection position located at a point deviated from the printing region of the recording medium, and a timer for generating a timing signal and a detector for detecting the setting of the printing head at the ink-failure preventive jet position are provided, wherein a print controller for controlling both the relative motion of the printing head to the recording medium and the selective ink ejection from the nozzles in response to print instruction signals is further enabled to control the displacement of the printing head to the ink-failure preventive ejection position in accordance with the timing signal of the timer, also the ink-failure preventive ejection from each nozzle in accordance with the output signal of the detector, and subsequent return of the printing head to the former position to resume the printing.

2. An ink jet printing apparatus comprising:

a source of electric power;

a printing unit including a printing head having a plurality of nozzles arrayed in parallel and adapted to independently eject ink droplets therefrom to a recording medium in accordance with an ejection signal, said printing head being adapted to move, in accordance with a moving signal, relatively to the recording medium in the direction perpendicular to the parallel array of the nozzles for effecting printing;

a source of print command signals;

control means coupled to said source of the print command signals and to said printing unit for generating the ejection signal and the moving signal in response to the print signal, said control means being selectively coupled to the power source;

timing means selectively coupled to the power source for periodically generating a timing signal for a first predetermined period of time upon lapse of a second predetermined period of time during the electric power is supplied to said timing means, said timing means being further coupled to said control means for interrupting the transmission of the printing signal from said source of print command signals in accordance with the timing signal and for generating the moving signal in response to said timing signal to displace said printing head to a fixed position while memorizing the displaced distance in said control means; and detecting means for detecting the setting of the printing head at said fixed position to generate an output signal upon detection, said detecting means being coupled to said control means for generating the ejection signal to effect the ejection of ink droplets from all the nozzles in response to said output signal delivered from said detecting means when said timing means generate the timing signal, said control means generating the moving signal to return said printing head located at said fixed position to the former position in accordance with the memorized distance when said timing means stops generating the timing signal upon lapse of the first period of time and when said memory is stored in said control means.

3. The apparatus according to claim 2, wherein said timing means comprises a timer adapted for generating the timing signal for the first predetermined period of time upon being reset to its initial state, counting the second predetermined period of time upon lapse of the first predetermined period of time, and being reset to the initial state after counting the second period of time.

4. The apparatus according to claim 2, wherein said timing means comprises a timer adapted for counting said second predetermined period of time upon being reset to its initial state and generating the timing signal until it is reset to the initial state after counting the second period of time, and delay means coupled to said timer for delaying the resetting of said timer for the first predetermined period of time.

5. The apparatus according to claim 2, further comprising a correction means coupled to said timing means for automatically correcting said second period of time preset to said timing means according to humidity and temperature conditions under which said apparatus is placed.

6. The apparatus according to claim 2, wherein said fixed position is a home position at which said printing head is positioned when electric power is supplied to said apparatus and when no print signal is transmitted from said source of print command signals to said control means.

7. The apparatus according to claim 2, wherein said fixed position is a capping position at which said printing head is positioned when electric power is not supplied to said apparatus and at which each of said nozzles is mounted with a cap for preventing solidification of an ink.

* * * * *